US010447665B2

(12) United States Patent
Kudaraya et al.

(10) Patent No.: US 10,447,665 B2
(45) Date of Patent: Oct. 15, 2019

(54) IPV6 LINK LOCAL SECURE NETWORK WITH BIOMETRIC SECURITY TO SECURE IOT DEVICES

(71) Applicant: KONICA MINOLTA LABORATORY U.S.A., INC., San Mateo, CA (US)

(72) Inventors: Richa Kudaraya, Fremont, CA (US); Maria Perez, Half Moon Bay, CA (US)

(73) Assignee: Konica Minolta Laboratory U.S.A., Inc., San Mateo, CA (US)

( * ) Notice: Subject to any disclaimer, the term of this patent is extended or adjusted under 35 U.S.C. 154(b) by 252 days.

(21) Appl. No.: 15/475,261

(22) Filed: Mar. 31, 2017

(65) Prior Publication Data

US 2018/0288015 A1    Oct. 4, 2018

(51) Int. Cl.
*H04L 29/06* (2006.01)
*H04L 29/08* (2006.01)
(Continued)

(52) U.S. Cl.
CPC ........ *H04L 63/0442* (2013.01); *H04L 9/0861* (2013.01); *H04L 9/14* (2013.01);
(Continued)

(58) Field of Classification Search
CPC ............. H04L 63/0442; H04L 61/2007; H04L 61/2038; H04L 61/2092; H04L 9/0861; H04L 67/12; H04L 9/14; H04L 47/32; H04L 9/30; H04N 2201/0094; H04N 2201/0039
USPC ...................................................... 713/168
See application file for complete search history.

(56) References Cited

U.S. PATENT DOCUMENTS 7,646,783 B2 * 1/2010 Uchida ............. H04L 29/12264
                                                          370/386
9,077,537 B2 * 7/2015 Kawale ................... H04L 9/302
(Continued)

FOREIGN PATENT DOCUMENTS

KR          101491320 B1      2/2015

OTHER PUBLICATIONS

T. Savolainen, et al., "IPv6 Addressing Strategies for IoT," in IEEE Sensors Journal, vol. 13, No. 10, pp. 3511-3519, Oct. 2013., doi: 10.1109/JSEN.2013.2259691, URL: http://ieeexplore.ieee.org/stamp/stamp.jsp?tp=&arnumber=6507541&isnumber=6583958 (Year: 2013).*
(Continued)

*Primary Examiner* — Oleg Korsak
*Assistant Examiner* — Feliciano S Mejia
(74) *Attorney, Agent, or Firm* — Buchanan Ingersoll & Rooney PC (57) ABSTRACT

A method, a computer program product, and a multi-function peripheral are disclosed, which secures a device using a link local network for transmission of data. The method includes starting an Internet Protocol Version 6 (IPv6) network initialization from an Internet of Things (IOT) device in an IPv6 link local network; deriving an identifier for a link local IPv6 address for the IOT device from a first public key of the IOT device; sending the link local IPv6 address with the identifier from the IOT device to the first host device for double address detection (dad) in the link local IPv6 network; and authenticating the link local IPv6 address on the first host device with a private key.

20 Claims, 4 Drawing Sheets

(51) Int. Cl.
    *H04L 9/14* (2006.01)
    *H04L 9/08* (2006.01)
    *H04N 1/44* (2006.01)
    *H04L 29/12* (2006.01)
    *H04L 9/32* (2006.01)

(52) U.S. Cl.
    CPC ........ *H04L 9/3247* (2013.01); *H04L 61/2007* (2013.01); *H04L 61/2038* (2013.01); *H04L 61/2092* (2013.01); *H04L 63/0428* (2013.01); *H04L 63/126* (2013.01); *H04L 67/12* (2013.01); *H04N 1/442* (2013.01); *H04N 2201/0039* (2013.01); *H04N 2201/0094* (2013.01)

(56) References Cited

U.S. PATENT DOCUMENTS

| | | | | |
|---|---|---|---|---|
| 9,288,059 B2* | 3/2016 | Nix | ......................... | H04W 4/70 |
| 10,097,517 B2* | 10/2018 | McElwee | ................ | H04L 9/088 |
| 2003/0051016 A1* | 3/2003 | Miyoshi | .................. | H04L 29/06 709/222 |
| 2003/0211842 A1* | 11/2003 | Kempf | .................. | H04L 9/0825 455/411 |
| 2007/0143608 A1* | 6/2007 | Zeng | ..................... | H04L 9/0836 713/168 |
| 2011/0119534 A1* | 5/2011 | Liu | ................... | H04L 29/12915 714/48 |
| 2017/0318053 A1* | 11/2017 | Singh | .................. | H04L 63/1491 |
| 2018/0309712 A1* | 10/2018 | Jeong | .................. | H04L 61/1511 |

OTHER PUBLICATIONS

C. Hennebert et al., "Security Protocols and Privacy Issues into 6LoWPAN Stack: A Synthesis," in IEEE Internet of Things Journal, vol. 1, No. 5, pp. 384-398, Oct. 2014., doi: 10.1109/JIOT.2014. 2359538, URL: http://ieeexplore.ieee.org/stamp/stamp.jsp?tp=&arnumber=6905706&isnumber=6932561 (Year: 2014).*

* cited by examiner

IPV6 LINK LOCAL SECURE NETWORK WITH BIOMETRIC SECURITY TO SECURE IOT DEVICES

FIELD OF THE INVENTION

The present invention relates to an Internet Protocol version 6 (IPv6) link local secure network to secure Internet of Things (IOT) devices, such as a mobile device, a smart phone, a personal computer, a camera, a medical device or apparatus, a multi-functional peripheral (MFP) or printer, and more particularly to an IPv6 link local secure network using biometric information from a user, for example, for transmission of sensitive data between IOT devices.

BACKGROUND OF THE INVENTION

Networks have enhanced our ability to communicate and access information by allowing one personal computer to communicate over a network (or network connection) with another personal computer and/or other networking devices, using electronic messages. When transferring an electronic message between personal computers or networking devices, the electronic message will often pass through a protocol stack that performs operations on the data within the electronic message (for example, packetizing, routing and flow control).

The first major version of addressing structure, Internet Protocol Version 4 (IPv4), is still the dominant protocol of the Internet, although the successor, Internet Protocol Version 6 (IPv6) is being deployed actively worldwide. The IPv6 network protocol provides that IPv6 hosts or host devices (for example, image forming apparatuses and other devices) can configure themselves automatically (i.e., stateless address autoconfiguration) when connected to an IPv6 network using ICMPv6 neighbor discovery messages (i.e., Neighbor Discovery Protocol or NDP).

IPv6 addresses are represented as eight groups of four hexadecimal digits with the groups being separated by colons. The IPv6 packet has two parts, a header and a payload. The header consists of a fixed portion followed by optional extensions to implement special features. The fixed header occupies the first 40 octets (320 bits) of the IPv6 packet and includes the source and destination addresses, traffic classification options, a hop counter, and the type of the optional extension or payload, which follows the header. Extension headers carry options that can be used for special treatment of a packet in the network, for example, for routing, fragmentation, and for security using the Internet Protocol Security (IPsec) framework.

When first connecting to a network, an IPv6 host (or node) sends a link-local multicast neighbor solicitation request advertising its tentative link-local address for duplicate address detection (dad), and if no problem is encountered, the host uses the link-local address. The router solicitations are sent (or router advertisements are received depending on timing) to obtain network-layer configuration parameters, and routers respond to such a request with a router advertisement packet that contains network-layer configuration parameters.

SUMMARY OF THE INVENTION

It would be desirable to have an application associated with an IOT device, for example, a mobile phone, a smart phone, a personal computer, a router, a camera, a MFP or printer, or a medical device or apparatus, which creates an IPv6 link local secure link local network with biometric security for transmission of sensitive data.

A method is disclosed of securing a device using a link local network for transmission of data, the method comprising: generating a private key for a user; creating one or more public keys from the private key; applying the one or more public keys to an Internet of Things (IOT) device as a first public key, the IOT device configured to be used by the user; giving the private key and at least two public keys to a first host device; starting an Internet Protocol Version 6 (IPv6) network initialization from the IOT device in an IPv6 link local network; deriving an identifier for a link local IPv6 address for the IOT device from the first public key of the IOT device; sending the link local IPv6 address with the identifier from the IOT device to the first host device for duplicate address detection (dad) in the link local IPv6 network; and authenticating the link local IPv6 address on the first host device with the private key.

A computer program product comprising a non-transitory computer usable medium having a computer readable code embodied therein is disclosed, which secures a device using a link local network for transmission of data, the process comprising: generating a private key for a user; creating one or more public keys from the private key; applying the one or more public keys to an Internet of Things (IOT) device as a first public key, the IOT device configured to be used by the user; giving the private key and at least two public keys to a first host device; starting an Internet Protocol Version 6 (IPv6) network initialization from the IOT device in an IPv6 link local network; deriving an identifier for a link local IPv6 address for the IOT device from the first public key of the IOT device; sending the link local IPv6 address with the identifier from the IOT device to the first host device for duplicate address detection (dad) in the link local IPv6 network; and authenticating the link local IPv6 address on the first host device with the private key.

A multi-function peripheral (MFP) is disclosed, which secures a device for transmission of data using a link local network, the multi-function peripheral comprising: a processor configured to: receive a link local Internet Protocol Version 6 (IPv6) address from an IOT device for duplicate address detection (dad) in a link local IPv6 network during an IPv6 network initialization from the IOT device, the link local IPv6 address derived from an identifier from a first public key of the IOT device; and authenticate the link local IPv6 address on the first host device with a private key corresponding to the public key of the IOT device.

It is to be understood that both the foregoing general description and the following detailed description are exemplary and explanatory and are intended to provide further explanation of the invention as claimed.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention. In the drawings.

DESCRIPTION OF THE PREFERRED EMBODIMENTS

Reference will now be made in detail to the present preferred embodiments of the invention, examples of which are illustrated in the accompanying drawings. Wherever possible, the same reference numbers are used in the drawings and the description to refer to the same or like parts.

In accordance with an exemplary embodiment, since IOT devices, for example, MFPs and medical devices are often not secured or may not be secured at all, it would be desirable to have a system and method, which can provide additional security, for example, for the transmission of personal information over a network, for example, a publically available network connection such as the Internet. In addition, any device connected to a network has potential vulnerabilities and the information provides over the network may be compromised.

In accordance with exemplary embodiment, it would be desirable to have physical security, for example, by the creation of an independent variant key that would be physically distributed between a user's place of residence and a trusted third party, for example, a medical office. In accordance with an exemplary embodiment, a system and method are disclosed, which can include a variant key that would be able to encrypt all the traffic from the IOTs initial data collection to the third party office without secure vulnerabilities in between. In accordance with an exemplary embodiment, the method and system as disclosed can provide a mechanism that does not require a network for verification if the link local network is isolated. Yet when a public network is available ability to transfer the data, which should be encrypted, for example, which is to be downloaded and read only by the trusted party having a private key.

In accordance with an exemplary embodiment, it would be desirable to create a secured link local network for IOT devices, using biometric information from a user created, for example, for the transmission of sensitive data. In accordance with an exemplary embodiment, the method and system as disclosed herein can be used for the transmission and storage of data in compliance with, for example, company, industry, and/or government standards and regulations, and wherein access to the data is restricted to maintain the security of the data. For example, the method and system as disclosed can be used with storage of electronic medical records and digitized test results in compliance with various regulations, for example, industry and/or governmental regulations.

Figure 1:
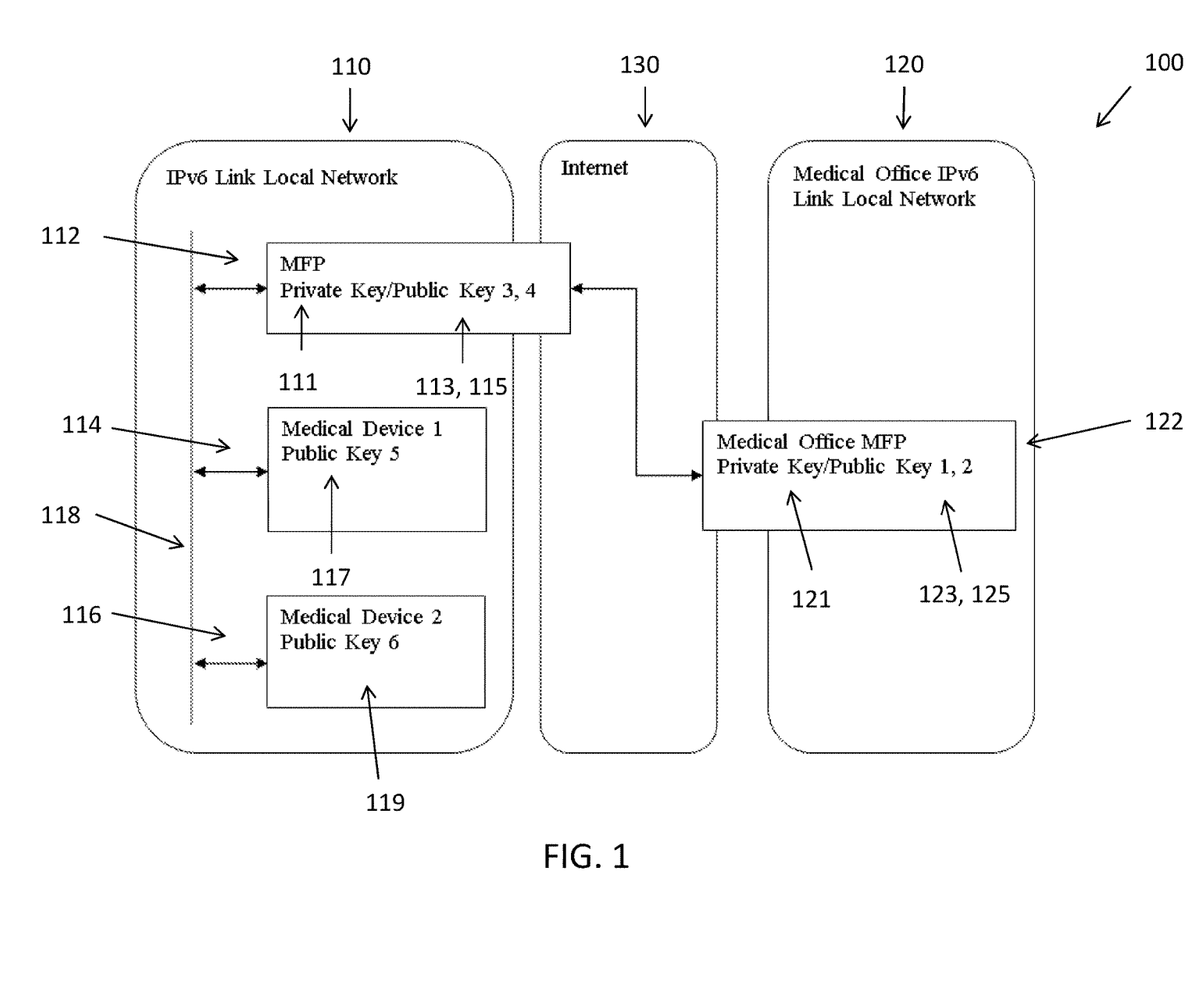
FIG. 1 is an illustration of a system for creating a secure link local network for IOT devices, using biometric information from a user, for example, for transmission of sensitive data in accordance with an exemplary embodiment.

FIG. 1 is an illustration of a system 100 for creating a secure link local network for IOT devices, using biometric information from a user, for example, for transmission of sensitive data in accordance with an exemplary embodiment. As shown in FIG. 1, the system 100 can include a first IPv6 link local network 110 having a plurality of IOT devices (host and client devices) 112, 114, 116, a second IPv6 link local network 120 having at least one IOT device (host device) 122, and a communication network 130, which connects the first IPv6 link local network 110 to the second IPv6 link local network 120. In accordance with an exemplary embodiment, for example, the first IPv6 link local network 110 is a home of a medical patient, and the second IPv6 link local network 120 is a medical office. In accordance with an exemplary embodiment, the IOT device 112, 114, 116 can be connected via a private network 118, for example, an IPv6 link local private network.

In accordance with an exemplary embodiment, the plurality of IOT devices 112, 114, 116, and 122 can be a smart phone, a tablet, a personal computer, a multi-functional peripheral (MFP), a printer, a printer server, a router, a camera, and/or a medical device or a medical apparatus. In accordance with an exemplary embodiment, the medical devices or medical apparatuses can be used, for example, for diagnostic and/or therapeutic purposes. Example of medical devices or medical apparatuses can include medical imaging devices, which can obtain, for example, radiological, angiographic, sonographic, and/or tomographic images. In accordance with an exemplary embodiment, at least one of the IOT devices 112, 114, 116, 122 can be authenticated by the user via an authentication module and/or a biometric identifier.

In accordance with an exemplary embodiment, one or more of the IOT devices 112, 114, 116, 122 can also preferably include an authentication module, which authenticates a user, for example, by fingerprint recognition or authentication, or other authentication protocols, which are currently implemented or will be implemented on smart phones, mobile devices, tablets, personal computers, medical devices and apparatuses, and/or MFPs or printers. In accordance with an exemplary embodiment, the authentication module, can be configured to receive, for example, a password authentication protocol, which uses credentials, such as username and password.

In accordance with an exemplary embodiment, one or more of the IOT devices 112, 114, 116, 122 can include a biometric identifier, which can be, for example, a fingerprint (or fingerprints), palm veins, facial recognition, DNA, palm print, hand geometry, iris recognition, retina, and/or odor/scent. In addition, to the use of the biometric identifier as disclosed herein for generating the public and private keys, the biometric identifier can be used to provide, for example, access to the IOT device 112, 114, 116, 122. For example, one or more biometric identifiers may be needed to access and/or use the IOT device 112, 114, 116, 122.

In accordance with an exemplary embodiment, for example, at least one or more of the IOT devices (or client device) 114, 116 can be a smart phone, a smart tablet, a personal digital assistance, a personal computer, a router, a camera (with or without a microphone), or a medical device or apparatus, which communicates with the at least one other IOT device (or host device) 112, 122, which is preferably a multi-function peripheral (MFP), a printer, a router, a server, or a print server through an IPv6 communication network 130 in a state capable of performing data communications.

In accordance with an exemplary embodiment, the plurality of IOT devices 112, 114, 116, 122 can be network devices, which support an IPv6 communication protocol (Internet Protocol version 6). Examples of communication networks 130 consistent with embodiments of the invention include, but are not limited to, the Internet, an Intranet, a local area network (LAN) and a wide area network (WAN). The plurality of IOT devices 112, 114, 116, 122, can be connected, for example, with a wireless connection by using radio frequency (RF), infrared (IR) transmission, IEEE1394 and/or other suitable wireless technology.

In accordance with an exemplary embodiment, the plurality of IOT devices 112, 114, 116, 122, which may be embodied by a smart phone, a smart tablet, a person computer, a camera, a router, a medical device or apparatus, or a MFP (or printer), and generates the print data usable in a printer, a print server, or multi-function peripheral (MFP) 112, 122 and transmits the generated printing data to the MFP 112, 122. In accordance with an exemplary embodiment, the IOT devices 112, 114, 116, 122 can include a printer driver program (hereinafter, sometimes simply referred to as a printer driver), and the IOT devices 112, 114, 116, 122, can use the function of the printer driver to generate a print job including the data of print conditions to be applied at the time of image formation, and image data, and sends the generated print job to the IOT device 112, 122, for example, which can be an MFP or printer.

In accordance with an exemplary embodiment, each of the one or more IOT devices 112, 114, 116, 122, can include a processor or central processing unit (CPU), and one or more memories for storing software programs and data (such as files to be printed). The processor or CPU carries out the instructions of a computer program, which operates and/or controls at least a portion of the functionality of the IOT devices 112, 114, 116, 122. Each of the IOT devices 112, 114, 116, 122 can also include an operating system (OS), which manages the computer hardware and provides common services for efficient execution of various software programs. For example, the software programs can include application software and printer driver software.

In accordance with an exemplary embodiment, at least one or more of the IOT devices 112, 122 can be a multi-function peripheral (MFP), which includes at least a copy function, an image reading function, a facsimile (fax) function, and a printer function, and forms an image on a sheet based on a print job (print instruction) received, from the at least one of the IOT devices 112, 114, 116, 122, from, for example, an IOT device 112, 114, 116, 122 in the form of a mobile device, a smart phone, a personal digital assistant, a personal computer, a camera, a router, and/or a medical device or apparatus.

In accordance with an exemplary embodiment, the IOT device 122 in the second IPv6 link local network 120 is preferably a multi-function peripheral (MFP) or printer 122, which can be connected to the one or more IOT devices 112, 114, 116 in the first IPv6 link local network 110 via the communication network (or global communication network) 130. In accordance with an exemplary embodiment, the communication network 130 communicates and transmits data via an IPv6 protocol. The one or more IOT devices 112, 114, 116, 122 can be configured to submit print jobs to the at least one multi-function printers or printers 112, 122 by transmitting data representing the documents to be printed and information describing the print job. The at least one multi-function peripheral (MFP) or printer 112, 122 can include a printer controller (or firmware), a memory section preferably in the form of a hard disk drive (HDD), an image processing section (or data dispatcher), a print engine, and an input/output (I/O) section.

In accordance with an exemplary embodiment, data may be transmitted in encrypted or unencrypted form between the nodes of the communication network (or network) 130 using a variety of different communication protocols including, for example, various Internet layer, transport layer, or application layer protocols. For example, data may be transmitted via the networks 130 using transmission control protocol/Internet protocol (TCP/IP), user datagram protocol (UDP), transmission control protocol (TCP), hypertext transfer protocol (HTTP), secure hypertext transfer protocol (HTTPS), dynamic adaptive streaming over HTTP (DASH), real-time streaming protocol (RTSP), real-time transport protocol (RTP) and the real-time transport control protocol (RTCP), file transfer protocol (FTP), WebSocket (WS), wireless access protocol (WAP), various messaging protocols (SMS, MMS, XMS, IMAP, SMTP, POP, WebDAV, etc.), or other known protocols.

In accordance with an exemplary embodiment, the implementation of IPv6 is being adopted by all networking infrastructures and IOT devices 112, 114, 116, 122. For example, be it a phone, a watch, a television (TV), or a medical device or apparatus 112, 114, 116, 122, the devices 112, 114, 116, 122 can be connected wirelessly to the network 130, IPv6 packets are available. An IPv6 packet is the smallest message entity exchanged via the Internet Protocol across an Internet Protocol version 6 (IPv6) network. The packets can consist of control information for addressing and routing, and a payload consisting of user data. The control information in IPv6 packets is subdivided into a mandatory fixed header and optional extension headers. The payload of an IPv6 packet is typically a datagram or segment of the higher-level Transport Layer protocol, but may be data for an Internet Layer, for example, ICMPv6, or Link Layer, for example, OSPF instead. The fixed header of an IPv6 packet consists of its first 40 octets (320 bits), and extension headers, which can carry optional Internet Layer information, and are placed between the fixed header and the upper-layer protocol header. In addition, several extension headers are defined in the IPv6 RFC.

In accordance with an exemplary embodiment, each of the IOT devices 112, 114, 116, 122 can include private keys 111, 121, and/or public keys, 113, 115, 117, 119, 123, 125. The use of public key cryptography (or asymmetric cryptography) can include a cryptographic system that uses pairs of keys, for example, public keys 113, 115, 117, 119, 123, 125, which may be disseminated widely, and corresponding private keys 111, 121, which are known only to the entrusted party and/or owner. The use of the public and private keys can accomplish authentication and encryption as disclosed herein. Authentication is when the public key 113, 115, 117, 119, 123, 125 can be used to verify that a holder of the paired private key 111, 121 sent the message, and encryption is whereby only the holder of the paired private key 111, 121, decrypting the message encrypted with the public key 113, 115, 117, 119, 123, 125.

In accordance with an exemplary embodiment as shown in FIG. 1, the private keys 111, 121, and public keys 113, 115, 117, 119, 123, 125, for example, can be created in an entrusted physical location (entrusted party), for example, the second IPv6 link local network 120, for example, which can be an office, for example, a medical office. For example, the entrusted party (second IPv6 link local network 120) can have a private key 121, and two public keys 123, 125 and provide a private key 111, and two public keys 113, 115, for example, to an MFP 112, and/or public keys 117, 119 to an IOT device 114, 116 physically to the user (first IPv6 link local network 110). In accordance with an exemplary embodiment, the private/public keys 111, 113, 115, 117, 119, 121, 123, 125 may also be transmitted via a biometrically encrypted medium, for example, Universal Serial Bus (USB), IPsec, virtual private network (VPN), or other secure mediums used for transportation to the user and/or the first IPv6 link local network 110.

In accordance with an exemplary embodiment, the link local network addresses in the user's home or office (or first IPv6 link local network 110) for the IOT devices 112, 114, 116 can be derived using the individual public keys 113, 115, 117, 119. The communication in this IPv6 link local network 110 can also be encrypted as well using private keys 111, 121. In accordance with an exemplary embodiment, the IOT device 112, 114, 116, 122 can only be trusted if the device 112, 114, 116, 122 is the owner of a public key 113, 115, 117, 119, 123, 125. In accordance with an exemplary embodiment, the IOT device 112, 114, 116, 122 can transmit data, for example, to an MFP or IPv6 router as disclosed herein. For example, in accordance with an exemplary embodiment, an MFP device 112, 122, for example would receive data, encrypt data with a copy of the private key 111, 121, and send the data through a public IPv6 network or global IPv6 network 130. In accordance with an exemplary embodiment, the IPv6 packets and data being sent through the public IPv6 network 130 can also include additional known security measures.

In accordance with an exemplary embodiment, the IPv6 packets can contain an IPv6 extension option with the hash of the packet encrypted by using the public key 113, 115, 117, 119, 123, 125. In addition, the IPv6 packets can contain an extension option with a public key 113, 115, 117, 119, 123, 125. In accordance with an exemplary embodiment, all the packets accepted by the trusted party must check such hash with the corresponding private key 111, 121 before accepting and decrypting any data. In accordance with an exemplary embodiment, the third party can use the private key 111, 121 as well to decrypt the received data. In accordance with an exemplary embodiment, IPv6 features can be used to transmit such data while using encryption from the instant the data is captured, to secure the data and the private network. In accordance with an exemplary embodiment, the method and system as disclosed herein can allow independence from relying on direct access to a public network without compromising data security.

In accordance with an exemplary embodiment, the use of biometric data to derive unique identifiers for link local addresses can help define the trusted devices in the network. In accordance with an exemplary embodiment, by deriving unique identifiers from biometric data, this can help avoid the requirement that each IOT device 112, 114, 116, 122 be connected to the internet directly, and instead the IOT device 112, 114, 116, 122 can be located in a link local network and use, for example, an MFP 112, 122 to transmit data encrypted as soon as the data is collected. In accordance with an exemplary embodiment, it would be desirable to have a key 111, 113, 115, 117, 119, 121, 123, 125 that is not fixed and can be changed frequently and only exchanged by, for example, a physical means. For example, in accordance with an exemplary embodiment, a mechanism can be implemented to check the packet integrity between the MFP 112, 122 and the trusted party network (or second IPv6 link local network 120).

Figure 2:
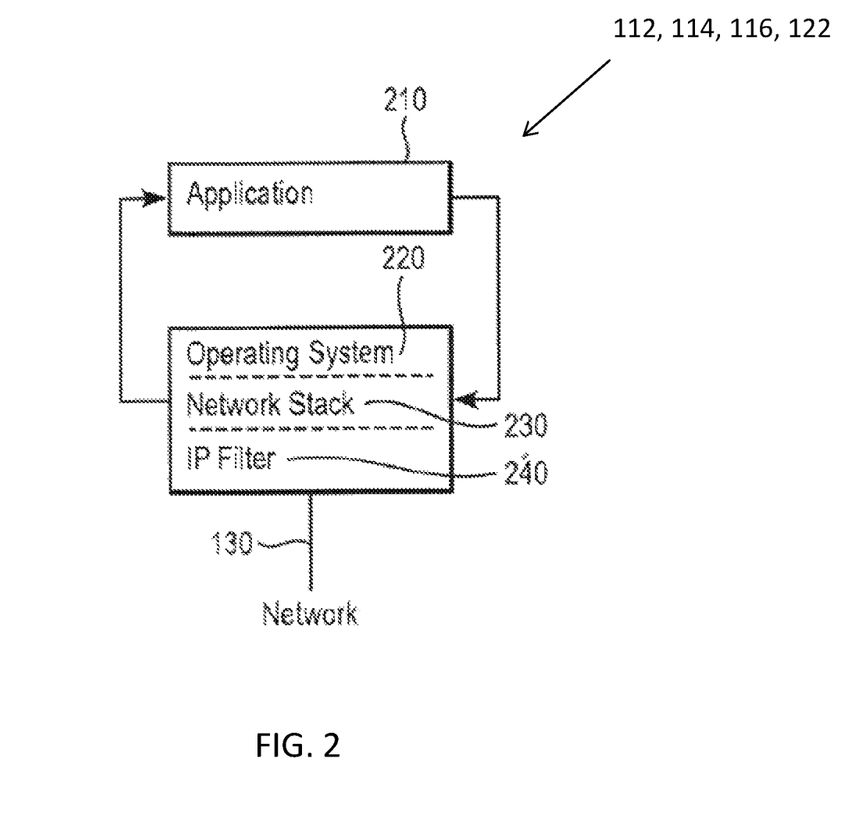
FIG. 2 is an illustration of a network stack for creating an IPv6 link local secure network with biometric security for an IOT device in accordance with an exemplary embodiment.

FIG. 2 is an illustration of a network stack for an IOT device 112, 114, 116, 122 having an application 210 for filtering data packets in accordance with an exemplary embodiment. As shown in FIG. 2, the IOT devices 112, 114, 116, 122, can have a software module (or application) 210 and an IP filter (or packet capture filter) 240, which captures (or intercepts) outgoing and incoming data packets having neighbor solicitation and/or neighbor advertisement requests pursuant to the IPv6 protocol. As shown in FIG. 2, the software module 210 is preferably an application level module, which is configured to modify, drop, change, and judge IPv6 packets as described herein. In accordance with an exemplary embodiment, the software module 210 can be part of the printer driver and/or firmware of the IOT devices 112, 114, 116, 122, or a separate software module or application, or part to the operating system of the IOT devices 1120, 114, 116, 122.

In accordance with an exemplary embodiment, the IP filter 240 forwards the incoming or outgoing IPv6 packets as described herein to the IP device 112, 114, 116, 122. Each of the IOT devices 112, 114, 116, 122 preferably includes a software module (or application) 210, which can perform at least a portion and/or more preferably all of the steps necessary to secure the IOT device 112, 114, 116, 122 with biometric security as disclosed herein.

The packets (or packages) are preferably broadcast and/or sent out via the IPv6 link local private network 118 and/or the IPv6 global communication network 130, for example, the Internet. In accordance with an exemplary embodiment, the IP filter 240 preferably captures the IPv6 packet before the initial broadcast (i.e., Neighbor Discovery) and/or alternatively, before the packet is sent to the Network Stack 230 for processing. In accordance with an exemplary embodiment, the software module's 210 functionality also can be enabled or disabled at will by a network administrator or other designated individual.

In accordance with an exemplary embodiment, each of the IOT devices 112, 114, 116, 122 can include an operating system 220 (OS), which acts as an interface between the device's hardware and application programs, and which is also responsible for the management and coordination of activities and the sharing of the resources within host devices. In accordance with an exemplary embodiment, the software module 210 runs on the operating system 220 of the IOT device 112, 114, 116, 122 and the network layer is under or a part of the operating system 220. It can be appreciated that by utilizing a software module 210 as described herein, the operating system of the host device 200 does not need to be altered or changed in anyway. Alternatively, it can be appreciated that in accordance with another exemplary embodiment, the operating system (OS) 220 can be configured to perform the methods as described herein.

Figure 3:
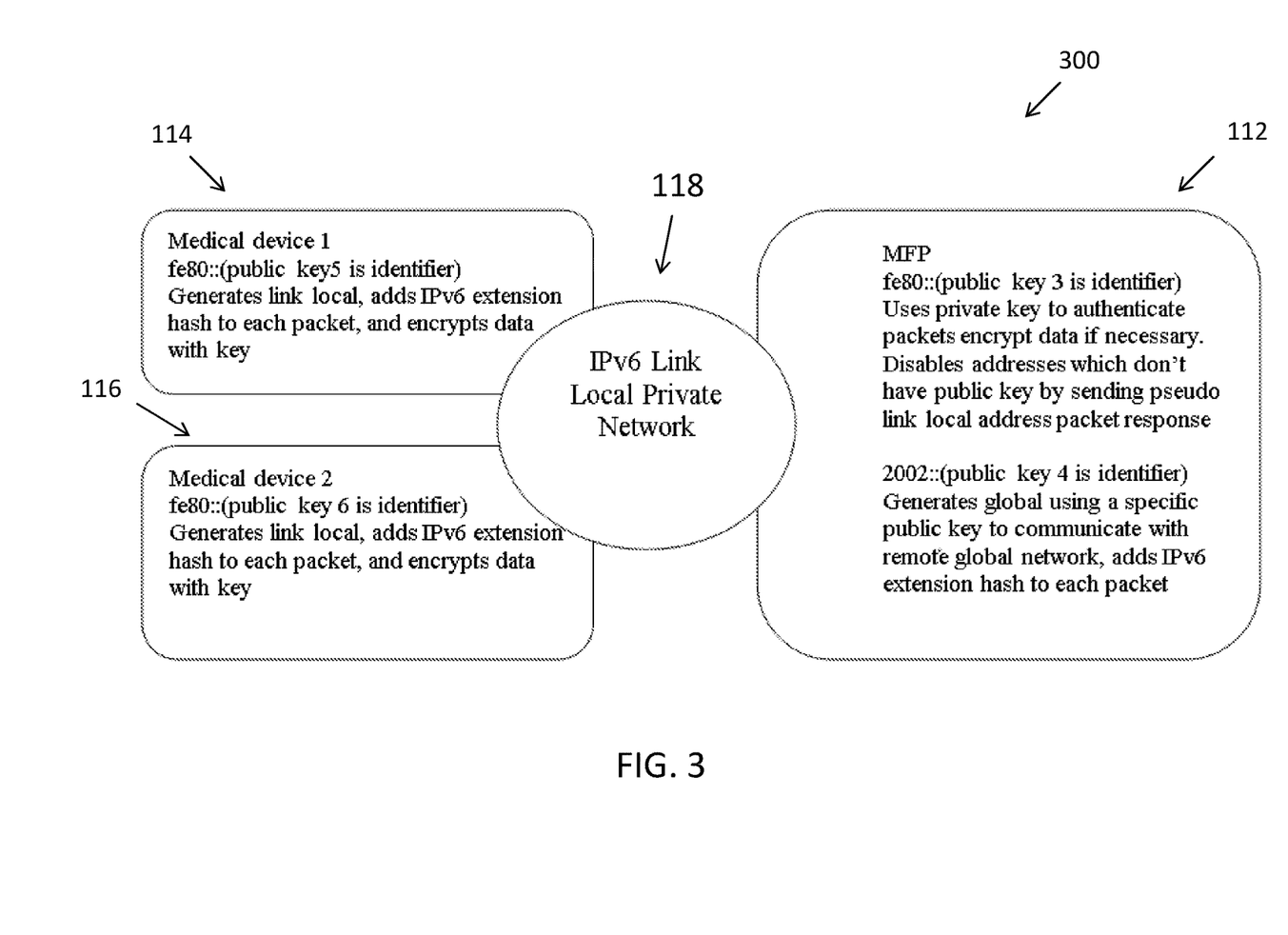
FIG. 3 is an illustration of a system for creating a secure link local network for IOT devices, using biometric information from a user, for example, for transmission of sensitive data in accordance with another exemplary embodiment.

FIG. 3 is an illustration of a system 300 for creating a secure private link local network for IOT devices 112, 114, 116, using biometric information from a user, for example, for transmission of sensitive data in an IPv6 link local private network 118 in accordance with an exemplary embodiment. As shown in FIG. 3, the system 300 can include two or more medical devices, for example, medical device 1 114 and medical device 2 116. Medical device 1 114 can have a link-local address of fe80::(public key 5 is identifier), which generates a link local address, adds an IPv6 extension hash to each packet, and encrypts data with key. Medical device 2 116 can have a link-local address of fe80::(public key 6 is identifier), which generates a link local address, adds an IPv6 extension hash to each packet, and encrypts data with key. The MFP 112 can have a link-local address of fe80::(public key 3 is identifier) and uses the private key to authenticate packets and encrypted data, if necessary. In accordance with an exemplary embodiment, for example, dad addresses (and/or packets) which do not have public key can be disabled by sending pseudo link local address packet response. In addition, the MFP, can the 2002::(public key is identifier), which generates a global address using a specific key to communicate with remote global network, and adds an IPv6 extension hash to each packet.

In accordance with an exemplary embodiment, for example, as shown in FIGS. 1 and 3, the system 100 can create a secure link local network for IOT devices 112, 114, 116, 122, using biometric information from a user. For example, the method and system as disclosed herein can be used for transmission and receipt of sensitive data from an individual and a medical office, and/or alternatively, between medical offices, hospitals, diagnostic centers and/or treatment facilities. In accordance with an exemplary embodiment, for example, a patient can be seen at a medical office (second IPv6 link local network 120), and biometric data from the patient can be collected such as a digital thumbprint or fingerprint. With such digital data, a private key 121 is created, and with such private key 121, several public keys 113, 115, 117, 119 can be created to be used for IOT devices 112, 114, 116, for example, a MFP 112 and/or medical devices 114, 116, used by a patient at home, for example, in a first IPv6 link local network 110. At the home of the patient (i.e., the first IPv6 link local network 110), each of the medical devices 114, 116 can be given one public key 117, 119, and the MFP 112 can receive a private key 111, and two public keys 113, 115.

In accordance with an exemplary embodiment, the IOT devices 112, 114, 116, 122 start IPv6 network initialization. In accordance with an exemplary embodiment, the identifier used for the link local IPv6 address should be derived from the public key 113, 115, 117, 119, 123, 125. The MFP 112 or 122 first receives DAD (IPv6 duplicate address detection) packets, if validation fails, the MFP 112 or 122 creates a pseudo DAD response packet claiming the link local address to disable the IOT device 112, 114, 116, 122. In accordance with an exemplary embodiment, after self link local addressing is completed, the IOT devices 112, 114, 116, 122 can start sending data. When the IOT device's IPv6 link local address is established all the data transmitted must be secured, either by encrypting the data with the public key 113, 115, 117, 119, 123, 124, or using, for example, IPsec between the IOT devices 112, 114, 116, and the IOT device (or MFP) 122.

In accordance with an exemplary embodiment, when the secure IPv6 link local network is established the device 112, 114, 116, 122 can send reports, data, for transmission to the MFP 112, 122. In addition, each IPv6 packet should contain an extension option with the hash sum of the integrity of the packet encrypted with the public key 113, 115, 117, 119, 123, 125. The MFP 112, 122 receives the packets and authenticates the IPv6 extension with the private key 111, 121, and any invalid packets are discarded. If the transmission of data outside the link local network 110 is required, the IOT device (or MFP) 112 can encrypt the data with a second public key 115, 125, if the data was not encrypted by the IOT device 114, 116, prior to being sent or forwarded to the IOT device (or MFP) 122.

In accordance with an exemplary embodiment, the MFP 112, 122 can add an IPv6 extension header option with the hash sum encrypted by the public key. The information can then be sent on the global IPv6 network 130 between the MFP 112 at the patient's home (the first IPv6 link local network 110) and the MFP 122 at the medical office (the second IPv6 link local network 120). The MFP 122 at the medical office has the private key 121 for the patient to authenticate and decrypt the information received and can provide the service requested, for example, storing of medical records and/or diagnostic results or images. In accordance with an exemplary embodiment, the private/public keys 111, 113, 115, 117, 119, 121, 123, 125 can be changed every time the patient visits the medical office (the second IPv6 link local address 120) to make the method and system more secure, if desired and/or necessary.

Figure 4:
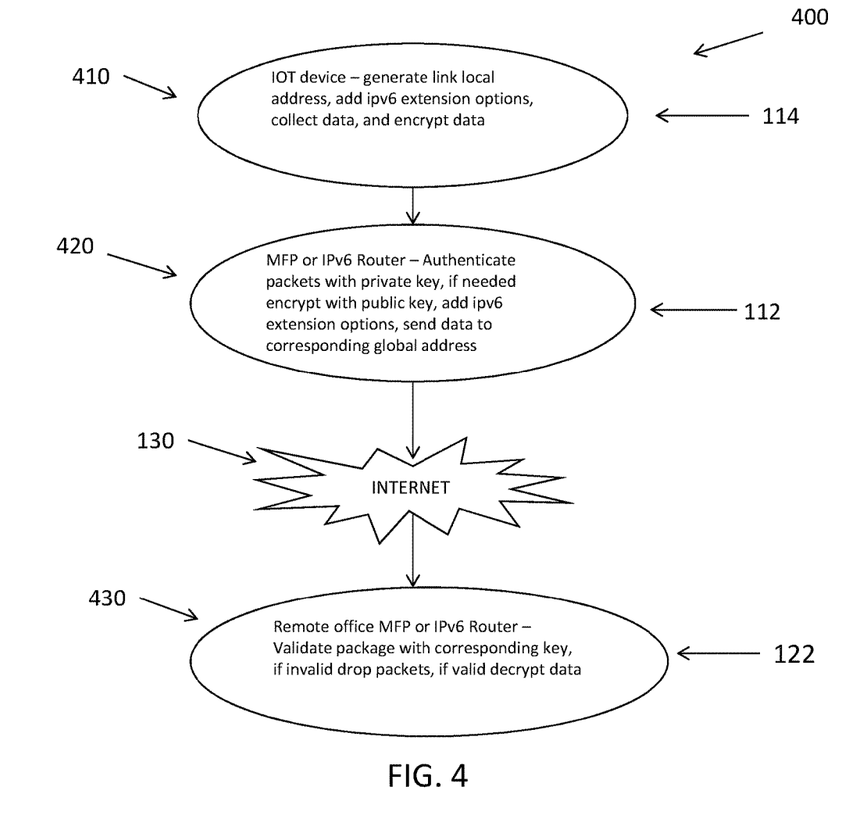
FIG. 4 is a flow chart illustrating a process for creating a secure link local network for IOT devices, using biometric information from a user, for example, for transmission of sensitive data in accordance with an exemplary embodiment.

FIG. 4 is a flow chart 400 illustrating a process for creating a secure link local network for IOT devices 112, 114, 116, 122, using biometric information from a user, for example, for transmission of sensitive data in accordance with an exemplary embodiment. As shown in FIG. 4, in step 410, the IOT device can generate the link local address, adds IPv6 extensions options, collects data, and encrypts data. In step 420, the MFP or IPv6 router authenticates the packets with the private key, and if needed, encrypts the packet with a public key, adds IPv6 extension options, and sends the data (and package) to a corresponding global address through the Internet 130. In step 430, for example, a remote office MFP or IPv6 router validates the package with corresponding key, if the corresponding key is invalid, the remote office MFP or IPv6 router drops the packets. Alternatively, if the corresponding key is valid, the remote office MFP or IPv6 router can decrypt the package and corresponding data.

In accordance with the exemplary embodiment, for example as shown in FIGS. 1 and 4, the biometric information of a caretaker (or patient) can be used, for example, to create private/public keys 111, 113, 115, 117, 121, 123, 125. For example, an IPv6 router 112 can include a private key 111 and two public keys 113, 115 (i.e., a public key of the Link local network/address, and a public key for a global address). A program on the router 112 configures the router 112 to use the public key 113 to create a link local address. In addition, an IOT device 114, for example, a camera (IOT camera) can have a public key 117 and the camera 114 can create its local link address based on the public key 117.

In accordance with an exemplary embodiment, the IOT device (or IOT camera) 114 starts IPv6 address auto configuration, and each IPv6 packet contains a hash encrypted with the public key 115 in an IPv6 extension. The IOT device (or router) 112 first checks the hash with its private key 111 corresponding to the public key 115 and accepts the ICMPv6 packets including the IOT device (or camera) 114 as trusted in the link local secure network 118. In the case, for example, the hash check fails, the router 112 can send a pseudo duplicate address detection (dad) packet claiming the address to deter the unauthorized device from joining the network.

In accordance with an exemplary embodiment, the IOT camera 114 can be authorized and starts sending data encrypted with its public key 117, plus the addition of IPv6 extension options to provide an encrypted hash, to the IPv6 router 112. The router 112 checks the IPv6 extensions for authentication and packet integrity, and then forwards the encrypted data using a global address of the router 112 correlated to the public key 115 of the router 112. In accordance with an exemplary embodiment, the packets should contain an encrypted hash with the public key 115, and a public key extension header. At the caretaker location 110, for example, a router 112, for example, can be setup with the private/public keys 111, 113, 115, to receive the packages and check for the related extension headers, then forward the data to the destination device 122, otherwise the packets are discarded.

In accordance with an exemplary embodiment, a computer program product comprising a non-transitory computer usable medium having a computer readable code embodied therein is disclosed, which secures a device using a link local network for transmission of data, the process comprising: generating a private key for a user; creating one or more public keys from the private key; applying the one or more public keys to an Internet of Things (IOT) device as a first public key, the IOT device configured to be used by the user; giving the private key and at least two public keys to a first host device; starting an Internet Protocol Version 6 (IPv6) network initialization from the IOT device in an IPv6 link local network; deriving an identifier for a link local IPv6 address for the IOT device from the first public key of the IOT device; sending the link local IPv6 address with the identifier from the IOT device to the first host device for duplicate address detection (dad) in the link local IPv6 network; and authenticating the link local IPv6 address on the first host device with the private key.

The non-transitory computer usable medium, of course, may be a magnetic recording medium, a magneto-optic recording medium, or any other recording medium which will be developed in future, all of which can be considered applicable to the present invention in all the same way. Duplicates of such medium including primary and secondary duplicate products and others are considered equivalent to the above medium without doubt. Furthermore, even if an embodiment of the present invention is a combination of software and hardware, it does not deviate from the concept of the invention at all. The present invention may be implemented such that its software part has been written onto a recording medium in advance and will be read as required in operation.

It will be apparent to those skilled in the art that various modifications and variation can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A method of securing a device using a link local network for transmission of data, the method comprising:
   generating a private key for a user;
   creating one or more public keys from the private key;
   applying the one or more public keys to an Internet of Things (IOT) device as a first public key, the IOT device configured to be used by the user;
   giving the private key and at least two public keys to a first host device;
   starting an Internet Protocol Version 6 (IPv6) network initialization from the IOT device in an IPv6 link local network;
   generating a link local IPv6 address for the IOT device from the first public key of the IOT device, the link local IPv6 address for the IOT device having an identifier derived from the first public key of the IOT device;
   sending the link local IPv6 address with the identifier from the IOT device to the first host device for duplicate address detection (dad) in the link local IPv6 network;
   authenticating the link local IPv6 address of the IOT device on the first host device with the private key; and
   disabling link local IPv6 addresses received on the first host device from the IOT device, which do not include an identifier derived from the first public key in the link local IPv6 address of the IOT device.

2. The method of claim 1, comprising:
   establishing connectivity between the IOT device and the first host device;
   sending an IPv6 packet with data from the IOT device to the first host device, the IPv6 packet including an extension option with a hash sum encrypted with the first public key; and
   receiving the IPv6 packet on the first host device and authenticating and decrypting the extension option with the hash sum with the private key on the first host device.

3. The method claim 2, comprising:
   executing the data on the IPv6 packet received from the IOT device on the first host device.

4. The method of claim 2, comprising:
   sending the IPv6 packet with data over a global IPv6 network to a second host device;
   receiving the IPv6 packet with data on the second host device and authenticating and decrypting the IPv6 packet with a second private key; and
   executing the data on the IPv6 packet received from the IOT device on the second host device.

5. The method of claim 1, comprising:
   establishing connectivity between the IOT device and the first host device;
   sending an IPv6 packet with data from the IOT device to the first host device;
   authenticating the IPv6 packet with data on the first host device;
   generating a global IPv6 packet with data from the IPv6 packet with data on the first host device;
   sending the global IPv6 packet with data from the first host device to a second host device over a global IPv6 network, the global IPv6 packet with data including an extension option with a hash sum encrypted with a second public key and a public key extension header;
   receiving the global IPv6 packet with data on the second host device and authenticating the extension option with the hash sum with a private key on the second host device; and
   executing the data on the global IPv6 packet received from the first host device on the second host device.

6. The method of claim 5, comprising:
   dropping any global IPv6 packets received from the first host device on the second host device, which do not include a corresponding public key.

7. The method of claim 1, comprising:
   collecting biometric data of the user; and
   generating the private key for the user based on the biometric data of the user.

8. The method of claim 1, comprising:
   sending a pseudo link local address packet response to the IOT device for the link local IPv6 addresses received on the first host device from the IOT device, which do not include the identifier derived from the first public key in the link local IPv6 address of the IOT device.

9. The method of claim 1, wherein the IOT device is a medical device, and the second host device is a multifunction peripheral (MFP) in a medical office, and further comprising:
   printing or storing the medical records on the MFP in the medical office.

10. The method of claim 1, comprising:
    transmitting data from the IOT device to the first host device by encrypting the data with the first public key or using IPsec.

11. A computer program product comprising a non-transitory computer usable medium having a computer readable code embodied therein, which secures a device using a link local network for transmission of data, the computer readable code when executed performs a process comprising:

generating a private key for a user;
creating one or more public keys from the private key;
applying the one or more public keys to an Internet of Things (IOT) device as a first public key, the IOT device configured to be used by the user;
giving the private key and at least two public keys to a first host device;
starting an Internet Protocol Version 6 (IPv6) network initialization from the IOT device in an IPv6 link local network;
generating a link local IPv6 address for the IOT device from the first public key of the IOT device, the link local IPv6 address for the IOT device having an identifier derived from the first public key of the IOT device;
sending the link local IPv6 address with the identifier from the IOT device to the first host device for duplicate address detection (dad) in the link local IPv6 network;
authenticating the link local IPv6 address of the IOT device on the first host device with the private key; and
disabling link local IPv6 addresses received on the first host device from the IOT device, which do not include an identifier derived from the first public key in the link local IPv6 address of the IOT device.

12. The computer program product of claim 11, comprising:
establishing connectivity between the IOT device and the first host device;
sending an IPv6 packet with data from the IOT device to the first host device, the IPv6 packet including an extension option with a hash sum encrypted with the first public key; and
receiving the IPv6 packet on the first host device and authenticating and decrypting the extension option with the hash sum with the private key on the first host device.

13. The computer program product of claim 12, comprising:
sending the IPv6 packet with data over a global IPv6 network to a second host device;
receiving the IPv6 packet with data on the second host device and authenticating and decrypting the IPv6 packet with a second private key; and
executing the data on the IPv6 packet received from the IOT device on the second host device.

14. The computer program product of claim 11, comprising:
establishing connectivity between the IOT device and the first host device;
sending an IPv6 packet with data from the IOT device to the first host device;
authenticating the IPv6 packet with data on the first host device;
generating a global IPv6 packet with data from the IPv6 packet with data on the first host device;
sending the global IPv6 packet with data from the first host device to a second host device over a global IPv6 network, the global IPv6 packet with data including an extension option with a hash sum encrypted with a second public key and a public key extension header;
receiving the global IPv6 packet with data on the second host device and authenticating the extension option with the hash sum with a private key on the second host device; and
executing the data on the global IPv6 packet received from the first host device on the second host device.

15. The computer program product of claim 14, comprising:
sending a pseudo link local address packet response to the IOT device for the link local IPv6 addresses received on the first host device from the IOT device, which do not include the identifier derived from the first public key in the link local IPv6 address of the IOT device; and/or
dropping any global IPv6 packets received from the first host device on the second host device, which do not include a corresponding public key.

16. A multi-function peripheral (MFP), which secures a device for transmission of data using a link local network, the multi-function peripheral comprising:
a processor configured to:
receive a link local Internet Protocol Version 6 (IPv6) address from an Internet of Things (IOT) device for duplicate address detection (dad) in a link local IPv6 network during an IPv6 network initialization from the IOT device, the link local IPv6 address having an identifier derived from a first public key of the IOT device;
authenticate the link local IPv6 address of the IOT device on the first host device with a private key corresponding to the public key of the IOT device; and
disable link local IPv6 addresses received on the first host device from the IOT device, which do not include an identifier derived from the first public key in the link local IPv6 address of the IOT device.

17. The multi-functional peripheral of claim 16, wherein the processor of the MFP is configured to:
establish connectivity between the IOT device and the MFP;
receive an IPv6 packet with data from the IOT device, the IPv6 packet including an extension option with a hash sum encrypted with the first public key; and
authenticate and decrypt the extension option with the hash sum with the private key.

18. The multi-functional peripheral of claim 17, wherein the processor of the MFP is configured to:
execute the data on the IPv6 packet received from the IOT device.

19. The multi-functional peripheral of claim 17, further comprising:
a host device; and
wherein the processor of the MFP is configured to:
send the IPv6 packet with data over a global IPv6 network to the host device; and
the host device having a processor configured to:
receive the IPv6 packet with data;
authenticate and decrypt the IPv6 packet with data with a second private key; and
execute the data from the IPv6 packet received from the MFP.

20. The multi-functional peripheral of claim 17, wherein the processor of the MFP is configured to:
establish connectivity with the IOT device;
receive an IPv6 packet with data from the IOT device;
authenticate the IPv6 packet with data received from the IOT device;
generate a global IPv6 packet with data from the IPv6 packet with data; and
send the global IPv6 packet with data to a second host device over a global IPv6 network, the global IPv6 packet with data including an extension option with a hash sum encrypted with a second public key and a public key extension header.

* * * * *